UNITED STATES PATENT OFFICE 2,562,970

PRESERVATION OF FORAGE CROPS

Chester Ray Thompson, Richmond, Calif., assignor to the United States of America as represented by the Secretary of Agriculture No Drawing. Application April 14, 1950,
Serial No. 156,033

22 Claims. (Cl. 99—8)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to the preservation of forage corps. In particular, the invention relates to the treatment of dried forage crops, such as dried grasses, legumes, and especially alfalfa, so as to stabilize the carotene content of the forage material.

The problem with which this invention is concerned may be illustrated by the following reference to alfalfa:

Alfalfa is widely used as a feed and as an ingredient in mixed feeds for chickens, cattle, and other livestock. It is especially valuable for such purposes because of its high carotene content. Generally, alfalfa is used in the form of a meal prepared by harvesting fresh alfalfa, drying it and comminuting the dried alfalfa to a meal. In this form the alfalfa will not spoil and can be readily bagged for storage or shipping. One problem that has beset the industry, however, is that upon storage certain chemical changes take place whereby the carotene content is rapidly decreased. For example if the meal is stored at 80° F., it loses about two-thirds of its carotene content in 24 weeks. Of course, at higher temperatures such as prevail in barns or warehouses in summer, the rate of carotene loss is greatly accelerated.

It has now been found that the carotene content of alfalfa or other forage crops is stabilized if certain quinoline derivatives are incorporated therewith. The quinoline derivatives which may be used in accordance with this invention are represented by the following formula:

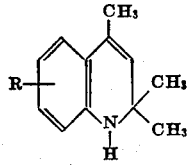

Wherein R represents hydrogen, a hydrocarbon radical, or a hydrocarbonoxy radical. Thus, for example, R may be hydrogen, methyl, ethyl, propyl, isopropyl, n-butyl, sec-butyl, isobutyl, tert-butyl, n-amyl, isoamyl, tert-amyl, sec-n-amyl, sec-isoamyl, phenyl, benzyl, methoxy, ethoxy, propoxy, isopropoxy, n-butoxy, sec-butoxy, isobutoxy, tert-butoxy, n-amoxy, isoamoxy, tert-amoxy, sec-n-amoxy, sec-isoamoxy, phenoxy, benzyloxy, and so forth. In general, I prefer to use the following compounds as the stabilizing agents:

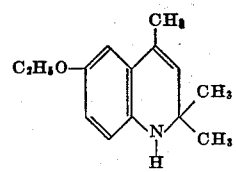

6-ethoxy-2,2,4-trimethyl-1,2-dihydroquinoline

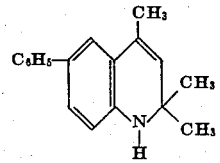

6-phenyl-2,2,4-trimethyl-1,2-dihydroquinoline

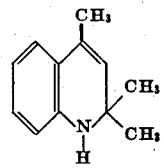

2,2,4-trimethyl-1,2-dihydroquinoline

Only a small amount of the above-described agents are required to obtain the stabilizing effect, i. e., from about 0.01% to about 0.5% based on the amount of forage material. The agents are generally applied to the forage in the form of a solution so that the small proportion of this material can be applied uniformly. Suitable solvents are, for example, ethylene glycol monoethyl ether, deodorized kerosene, ethanol, n-propanol, iso-propanol, n-butanol, propylene glycol, and glyceride oils such as cottonseed oil, soybean oil, coconut oil, corn oil, peanut oil, sesame oil, and so forth. Glyceride oils, especially crude vegetable oils are preferred solvents as they reduce dustiness of the dehydrated forage and further in some cases, alfalfa, for example, they give it an enhanced green color. In using a glyceride oil as the solvent it is preferred to first dissolve the stabilizing agent in a small amount of acetone and then mix this solution with the oil. In this way solution of the stabilizing agent is more readily attained. Generally, the beneficial effect of the glyceride oil is attained when applied in a proportion of from about 0.5% to about 5%, based in the amount of forage. The concentration of the stabilizing agent in the solvent is not critical, generally for convenience a 5 to 10% solution is used. The most convenient method of applying the solution of the stabilizing agent is to spray it onto the forage. To secure uniform impregnation, the forage is preferably agitated by suitable means during the spraying to expose all surfaces thereof to the spray. Thus one practical method involves tumbling the forage about in a rotating drum while the solution is sprayed into the interior of the drum. Another method involves allowing the forage to fall through a tower equipped with baffles while it is sprayed with the solution on its passage through the tower. It is evident that any other apparatus or method which is adapted to obtain uniform impregnation can be used. The solution of the stabilizing agent can be applied to the finished dehydrated forage or it can be applied to the forage at various stages in its processing. Thus for example, the solution can be applied to the forage after it is dehydrated but before it is comminuted to form a meal. Further, the solution can be applied while the dehydrated forage is being milled to produce the meal.

The following examples disclose steps and conditions within the scope of this invention. It is understood that these examples are furnished only by way of illustration and not limitation.

EXAMPLE I

A 200-gram sample of dehydrated alfalfa meal was placed in a rotatable cylinder provided with baffles. While rotating the cylinder to cause thorough agitation of the meal, the meal was sprayed with 4 ml. of an ethylene glycol monoethyl ether solution containing 0.25 gram of 6 - ethoxy - 2,2,4 - trimethyl - 1,2 - dihydroquinoline. The treated meal therefore contained 0.125% of the stabilizing agent.

Samples of the treated meal and a sample of the untreated meal (control) were stored in open vessels at 65° C. and the carotene content of each sample was determined after storage for 14 days at this temperature. The carotene contents after storage were compared with the original carotene content of the meal to determine the proportion of carotene remaining in the meal after storage. The following results were obtained:

*Table 1*

| Sample | Proportion of original carotene remaining in meal after storage at 65° C. for 14 days, percent |
|---|---|
| Untreated sample (control) | 23 |
| Treated sample | 64 |

EXAMPLE II

A series of 200-gram samples of dehydrated alfalfa meal were each treated with a 1% solution of 6-ethoxy-2,2,4-trimethyl-1,2-dihydroquinoline in crude cottonseed oil using the same technique as set forth in Example I. In each case the amount of solution used was varied so that the respective samples contained varying amounts of the stabilizing agent.

An untreated sample (control) and the treated samples were then stored at 65° C. in open vessels and then analyzed for carotene content. The carotene contents after storage were compared with the original carotene content of the meal to determine the proportion of original carotene remaining in the meal after storage. The following results were obtained:

*Table 2*

| Expt. No. | Proportion of 6-ethoxy-2,2,4-trimethyl-1,2-dihydroquinoline, per cent | Proportion of original carotene remaining in meal after storage at 65° C. for 14 days, per cent |
|---|---|---|
| 1 | none (control) | 23 |
| 2 | 0.5 | 74 |
| 3 | 0.125 | 66 |
| 4 | 0.01 | 38 |

EXAMPLE III

Two 200-gram samples of dehydrated alfalfa meal were treated with solutions of 6-phenyl-2,2,4-trimethyl-1,2-dihydroquinoline as set forth in Example I. In one case, the stabilizing agent was applied as a 1.7% solution in ethyleneglycol monoethyl ether; in the other case, the stabilizing agent was applied as a 1% solution in crude cottonseed oil. In both cases, the treated meal contained 0.125% of the stabilizing agent.

Two 200-gram samples of dehydrated alfalfa meal were treated with solutions of 2,2,4-trimethyl-1,2-dihydroquinoline as set forth in Example I. In one case, the stabilizing agent was applied as a 1.7% solution in ethylene glycol monoethyl ether; in the other case, the stabilizing agent was applied as a 1% solution in crude cottonseed oil. In both cases, the treated meal contained 0.125% of the stabilizing agent.

Samples of the treated meal and a sample of the untreated meal (control) were stored in open vessels at 65° C. and the carotene content of each sample was determined after storage for 14 days at this temperature. The carotene contents after storage were compared with the original carotene content of the meal to determine the carotene remaining in the meal after storage. The following results were obtained:

*Table 3*

| Stabilizer | Solvent | Proportion of original carotene remaining in meal after storage at 65° C. for 14 days, per cent |
|---|---|---|
| none (control) | | 23 |
| 6-phenyl-2,2,4-trimethyl-1,2-dihydroquinoline | ethyleneglycol monoethyl ether | 48 |
| 6-phenyl-2,2,4-trimethyl-1,2-dihydroquinoline | crude cottonseed oil | 47 |
| 2,2,4-trimethyl-1,2-dihydroquinoline | ethyleneglycol monoethyl ether | 47 |
| 2,2,4-trimethyl-1,2-dihydroquinoline | crude cottonseed oil | 55 |

It has been established that the above-described dihydroquinoline derivatives stabilize the carotene content of forage crops. The mechanism of the stabilization is not known although the foregoing data indicate that the agents act as negative catalysts in preventing oxidation of the carotene. The powerful stabilizing effect of these compounds in this respect is surprising because many known anti-oxidants have little if any effect on the stabilization of carotene. This fact is shown by the following experiments:

A series of 200-gram samples of dehydrated alfalfa meal were each treated with a solution of a known anti-oxidant using the spray technique set forth in Example I. In each case, the solution contained 0.25 gram of the anti-oxidant and was made up to a volume of 4 ml. with ethylene glycol monoethyl ether. In each case the treated meal contained 0.125% of the anti-oxidant. An untreated sample (control) and the treated sample were stored at 65° C. in open vessels and then analyzed for carotene content. The carotene contents after storage were compared with the original carotene content of the meal to determine the proportion of original carotene remaining in the meal after storage. The following results were obtained:

Table 4

| Expt. | Anti-oxidant | Proportion of original carotene remaining in meal after storage at 65° C. for 10 days, percent | Proportion of original carotene remaining in meal after storage at 65° C. for 14 days, percent |
|---|---|---|---|
| 1 | none used (control) | 36 | 22 |
| 2 | nordihydroguaiaretic acid | 38 | -- |
| 3 | thiodipropionic acid | 37 | -- |
| 4 | lauryl thiodipropionate | 37 | -- |
| 5 | ethyl gallate | 39 | -- |
| 6 | lauryl gallate | 40 | -- |
| 7 | catechol | -- | 25 |
| 8 | pyrogallol | -- | 29 |
| 9 | hydroquinone monomethyl ether | -- | 25 |
| 10 | p-tertiary butyl catechol | -- | 31 |
| 11 | diphenylamine | -- | 34 |
| 12 | ethyl hydrocaffeate | -- | 26 |
| 13 | 2,4-dimethyl-6-tertiary-butyl phenol | -- | 26 |

Having thus described my invention, I claim:

1. The process of stabilizing a forage crop which comprises incorporating therewith at least one compound selected from the group consisting of 2,2,4-trimethyl-1,2-dihydroquinoline, its hydrocarbon substituted derivatives, and its hydrocarbonoxy substituted derivatives.

2. The process of stabilizing a forage crop which comprises incorporating therewith 6-ethoxy-2,2,4-trimethyl-1,2-dihydroquinoline.

3. The process of stabilizing a forage crop which comprises incorporating therewith 6-phenyl-2,2,4-trimethyl-1,2-dihydroquinoline.

4. The process of stabilizing a forage crop which comprises incorporating therewith 2,2,4-trimethyl-1,2-dihydroquinoline.

5. The process in accordance with claim 1 wherein the forage crop is dehydrated alfalfa.

6. The process in accordance with claim 2 wherein the forage crop is dehydrated alfalfa.

7. The process in accordance with claim 3 wherein the forage crop is dehydrated alfalfa.

8. The process in accordance with claim 4 wherein the forage crop is dehydrated alfalfa.

9. The process of stabilizing dehydrated alfalfa which comprises spraying an agitated mass of dehydrated alfalfa with a solution of 6-ethoxy-2,2,4-trimethyl-1,2-dihydroquinoline.

10. The process of stabilizing dehydrated alfalfa which comprises spraying an agitated mass of dehydrated alfalfa with a solution of 6-phenyl-2,2,4-trimethyl-1,2-dihydroquinoline.

11. The process of stabilizing dehydrated alfalfa which comprises spraying an agitated mass of dehydrated alfalfa with a solution of 2,2,4-trimethyl-1,2-dihydroquinoline.

12. A stabilized forage product consisting of a forage crop having incorporated therewith at least one compound selected from the group consisting of 2,2,4-trimethyl-1,2-dihydroquinoline, its hydrocarbon substituted derivatives and its hydrocarbonoxy substituted derivatives.

13. A stabilized forage product consisting of a forage crop having incorporated therewith 6-ethoxy-2,2,4-trimethyl-1,2-dihydroquinoline.

14. A stabilized forage product consisting of a forage crop having incorporated therewith 6-phenyl-2,2,4-trimethyl-1,2-dihydroquinoline.

15. A stabilized forage product consisting of a forage crop having incorporated therewith 2,2,4-trimethyl-1,2-dihydroquinoline.

16. A product in accordance with claim 12 wherein the forage crop is dehydrated alfalfa.

17. A product in accordance with claim 13 wherein the forage crop is dehydrated alfalfa.

18. A product in accordance with claim 14 wherein the forage crop is dehydrated alfalfa.

19. A product in accordance with claim 15 wherein the forage crop is dehydrated alfalfa.

20. A stabilized dehydrated alfalfa product consisting of dehydrated alfalfa and from about 0.01% to about 0.5% of 6-ethoxy-2,2,4-trimethyl-1,2-dihydroquinoline incorporated therewith.

21. A stabilized dehydrated alfalfa product consisting of dehydrated alfalfa and from about 0.01% to about 0.5% of 6-phenyl-2,2,4-trimethyl-1,2-dihydroquinoline incorporated therewith.

22. A stabilized dehydrated alfalfa product consisting of dehydrated alfalfa and from 0.01% to about 0.5% of 2,2,4-trimethyl-1,2-dihydroquinoline incorporated therewith.

CHESTER RAY THOMPSON.

REFERENCES CITED

The following references are of record in the file of this patent:

UNITED STATES PATENTS

| Number | Name | Date |
|---|---|---|
| 2,030,033 | McConnell | Feb. 4, 1936 |
| 2,381,771 | Paul | Apr. 7, 1945 |
| 2,474,182 | Kephart | June 21, 1949 |
| 2,487,707 | Hartmann et al. | Nov. 8, 1949 |